US011908408B2

(12) United States Patent
Furukawa

(10) Patent No.: US 11,908,408 B2
(45) Date of Patent: Feb. 20, 2024

(54) DISPLAY DEVICE AND DRIVING METHOD THEREFOR

(71) Applicant: Sharp Kabushiki Kaisha, Sakai (JP)

(72) Inventor: Tomoo Furukawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/014,768

(22) PCT Filed: Jul. 29, 2020

(86) PCT No.: PCT/JP2020/028965
§ 371 (c)(1),
(2) Date: Jan. 6, 2023

(87) PCT Pub. No.: WO2022/024236
PCT Pub. Date: Feb. 3, 2022

(65) Prior Publication Data
US 2023/0298523 A1 Sep. 21, 2023

(51) Int. Cl.
*G09G 3/3233* (2016.01)

(52) U.S. Cl.
CPC .................................. *G09G 3/3233* (2013.01)

(58) Field of Classification Search
None
See application file for complete search history.

(56) References Cited

U.S. PATENT DOCUMENTS

2009/0201231 A1 8/2009 Takahara et al.
2019/0311688 A1 10/2019 Kitagawa et al.

FOREIGN PATENT DOCUMENTS

CN 109671398 A * 4/2019 .............. G09G 3/32
JP 2009-276744 A 11/2009
JP 2019-184725 A 10/2019
KR 10-2012-0069137 A 6/2012

OTHER PUBLICATIONS

Official Communication issued in International Patent Application No. PCT/JP2020/028965, dated Sep. 24, 2020.

* cited by examiner

*Primary Examiner* — Duane N Taylor, Jr.
(74) *Attorney, Agent, or Firm* — Keating & Bennett, LLP

(57) ABSTRACT

Provided is a display device with pixel circuits, each including first compensation transistor connected to a control terminal of a drive transistor at one conductive terminal, an intermediate node at another conductive terminal, and a scanning line at a control terminal, a second compensation transistor connected to the intermediate node at one conductive terminal, a conductive terminal of the drive transistor at another conductive terminal, and the scanning line at a control terminal, and a capacitor connected to the intermediate node at one electrode and a control line at another electrode. The driver circuit changes a potential of the scanning line from on to off level and also changes a potential of the control line from a second level to a first level, in an opposite direction to the change in the potential thereof.

15 Claims, 12 Drawing Sheets

DISPLAY DEVICE AND DRIVING METHOD THEREFOR

TECHNICAL FIELD

The disclosure relates to display devices, particularly to a display device that includes pixel circuits incorporating current-driven light-emitting elements.

BACKGROUND ART

In recent years, organic EL display devices that include pixel circuits incorporating organic electro-luminescent (abbreviated below as EL) elements have been put into practical use. In addition to the organic EL elements, the pixel circuits in the organic EL display devices include drive transistors, write control transistors, etc. These transistors are thin-film transistors (referred to below as TFTs). The organic EL elements are current-driven light-emitting elements, which emit light with luminances corresponding to the amount of current flowing therethrough. The drive transistors are provided in series with the organic EL elements to control the amount of current flowing through the organic EL elements.

The drive transistors are prone to variations and shifts in characteristics. Accordingly, in order for the organic EL display devices to achieve high-quality image display, it is necessary to compensate for variations and shifts in the characteristics of the drive transistors. For the organic EL display devices, there are known compensation methods in which the characteristics of the drive transistors are compensated for within the pixel circuits (internal compensation) or outside the pixel circuits (external compensation). In the case of an organic EL display device that performs internal compensation, the pixel circuit includes a compensation transistor provided between the drive transistor's gate terminal and the drive transistor's conductive terminal close to the organic EL element. Such an organic EL display device that performs internal compensation is described in, for example, Patent Document 1.

In addition to the above, there are known organic EL display devices which perform low-frequency drive at a lower frame frequency than normal. Performing low-frequency drive renders it possible to reduce the number of writes to the pixel circuits and thereby save power consumption of the organic EL display device. Such an organic EL display device that performs low-frequency drive is described in, for example, Patent Document 2.

There are various known pixel circuits for the organic EL display devices. FIG. 11 is a circuit diagram of a pixel circuit in a known organic EL display device that performs internal compensation. The pixel circuit 91 shown in FIG. 11 includes a TFT Q4 functioning as a drive transistor. Provided between gate and drain terminals of the TFT Q4 are two TFTs Q2*a* and Q2*b* connected in series to serve as a compensation transistor. The reason for using the two TFTs connected in series as a compensation transistor is to prevent leakage current from the gate terminal of the TFT Q4.

CITATION LIST

Patent Documents

Patent Document 1: Japanese Laid-Open Patent Publication No. 2009-276744

Patent Document 2: Japanese Laid-Open Patent Publication No. 2019-184725

SUMMARY

Technical Problem

The known organic EL display device including the pixel circuits 91 is prone to display screen flickering during low-frequency drive. This problem will be described with reference to FIG. 12. It is assumed here that the organic EL display device performs low-frequency drive at a frame frequency half as high as normal, and also that the organic EL elements emit light twice during one frame period. Hereinafter, the node that connects a source terminal of the TFT Q2*a* and a drain terminal of the TFT Q2*b* will be referred to as an intermediate node N9.

As shown in FIG. 12, the potential of a scanning line Gi is set at low level once every frame period for a predetermined period of time. Before the potential of the scanning line Gi is changed to low level, the TFT Q4 is in an on state. Once the potential of the scanning line Gi is changed to low level, the TFTs Q2*a* and Q2*b*, along with a TFT Q3, are turned on. While the potential of the scanning line Gi is at low level, the TFT Q4 has a gate potential approximately equal to the potential of the intermediate node N9, and both the potentials correspond to the potential of a data line Sj.

When the potential of the scanning line Gi is changed to high level, the TFTs Q2*a*, Q2*b*, and Q3 are turned off. Ideally, the gate potential of the TFT Q4 and the potential of the intermediate node N9 are not changed thereafter. However, in actuality, once the potential of the scanning line Gi is changed to high level, the potential of the intermediate node N9 increases due to parasitic capacitance (not shown) between the terminals of the TFTs Q2*a* and Q2*b*. Accordingly, after the potential of the scanning line Gi is changed to high level, leakage current might flow through the TFTs Q2*a* and Q2*b*, with the result that the potential of the intermediate node N9 gradually decreases, and the gate potential of the TFT Q4 gradually increases. The higher the gate potential of the TFT Q4, the lower the current flow through the organic EL element L9, and the lower the luminance of the organic EL element L9.

One frame period includes first and second emission periods, and during the first and second emission periods, the potential of an emission control line Ei is set at low level. As described earlier, the gate potential of the TFT Q4 gradually increases after the potential of the scanning line Gi is changed to high level. Accordingly, the luminance of the organic EL element L9 gradually decreases during the first and second emission periods, between which there is a non-emission period during which the luminance of the organic EL element L9 is temporarily almost zero. As a result, the luminance of the organic EL element L9 is lower during the second emission period than during the first emission period. The difference in luminance is recognized as display screen flickering.

To solve the above problem, it is conceivable to use a pixel circuit 92 shown in FIG. 13. The pixel circuit 92 is configured by adding a capacitor C9 to the pixel circuit 91. The capacitor C9 is connected to the intermediate node N9 at a first electrode and supplied with a constant high-level potential ELVDD at a second electrode. Thus, the potential of the intermediate node N9 can be prevented to some extent from varying.

However, in the pixel circuit 92, the capacitor C9 is simply supplied with the constant high-level potential ELVDD at the second electrode. Therefore, the potential of the intermediate node N9 cannot be sufficiently prevented from varying when the potential of the scanning line Gi is changed to high level. Even the organic EL display device that includes the pixel circuits 92 cannot sufficiently prevent display screen flickering during low-frequency drive.

Therefore, a problem to be solved is to provide a display device capable of preventing display screen flickering during low-frequency drive.

Solution to Problem

The above problem can be solved, for example, by a display device including: a display portion including a plurality of scanning lines, a plurality of control lines, and a plurality of pixel circuits; and a driver circuit configured to drive the scanning lines and the control lines. Each of pixel circuits includes: a light-emitting element; a drive transistor provided in series with the light-emitting element to control the amount of current flowing through the light-emitting element; a first compensation transistor connected to a control terminal of the drive transistor at a first conductive terminal, an intermediate node at a second conductive terminal, and one of the scanning lines at a control terminal; a second compensation transistor having the same conductivity type as the first compensation transistor and connected to the intermediate node at a first conductive terminal, the drive transistor's conductive terminal close to the light-emitting element at a second conductive terminal, and the one of the scanning lines at a control terminal; and a capacitor connected to the intermediate node at a first electrode and one of the control lines at a second electrode. The driver circuit changes a potential of the one of the scanning lines from on to off level and also changes a potential of the one of the control lines from a second level to a first level, in an opposite direction to the change in the potential of the one of the scanning lines, at a time corresponding to the change in the potential of the one of the scanning lines.

The above problem can also be solved by a display device including: a display portion including a plurality of first scanning lines, a plurality of second scanning lines, a plurality of control lines, and a plurality of pixel circuits; and a driver circuit configured to drive the first scanning lines, the second scanning lines, and the control lines. Each of the pixel circuits includes: a light-emitting element; a drive transistor provided in series with the light-emitting element to control the amount of current flowing through the light-emitting element; a first compensation transistor connected to a control terminal of the drive transistor at a first conductive terminal and an intermediate node at a second conductive terminal; a second compensation transistor connected to the intermediate node at a first conductive terminal and the drive transistor's conductive terminal close to the light-emitting element at a second conductive terminal; and a capacitor connected to the intermediate node at a first electrode and one of the control lines at a second electrode, and one of either the first or second compensation transistor is a P-channel transistor connected to one of the first scanning lines at a control terminal, the other of the first or second compensation transistor is an N-channel transistor connected to one of the second scanning lines at a control terminal. The driver circuit changes a potential of the one of the second scanning lines from high to low level and also changes a potential of the one of the control lines from a second level to a first level, in an opposite direction to the change in the potential of the one of the second scanning lines, at a time corresponding to the change in the potential of the one of the second scanning lines.

The above problem can also be solved by a method for driving a display device having a display portion that includes a plurality of scanning lines, a plurality of control lines, and a plurality of pixel circuits. Each of the pixel circuits includes a light-emitting element, a drive transistor provided in series with the light-emitting element to control the amount of current flowing through the light-emitting element, a first compensation transistor connected to a control terminal of the drive transistor at a first conductive terminal, an intermediate node at a second conductive terminal, and one of the scanning lines at a control terminal, a second compensation transistor having the same conductivity type as the first compensation transistor and connected to the intermediate node at a first conductive terminal, the drive transistor's conductive terminal close to the light-emitting element at a second conductive terminal, and the one of the scanning lines at a control terminal, and a capacitor connected to the intermediate node at a first electrode and one of the control lines at a second electrode. The method includes driving the scanning lines; and driving the control lines. The one of the scanning lines has a potential changed from on to off level, and the one of the control lines has a potential changed from a second level to a first level, in an opposite direction to the change in the potential of the one of the scanning lines, at a time corresponding to the change in the potential of the one of the scanning lines.

The above problem can also be solved by a method for driving a display device having a display portion that includes a plurality of first scanning lines, a plurality of second scanning lines, a plurality of control lines, and a plurality of pixel circuits. Each of the pixel circuits includes a light-emitting element, a drive transistor provided in series with the light-emitting element to control the amount of current flowing through the light-emitting element, a first compensation transistor connected to a control terminal of the drive transistor at a first conductive terminal and an intermediate node at a second conductive terminal, a second compensation transistor connected to the intermediate node at a first conductive terminal, the drive transistor's conductive terminal close to the light-emitting element at a second conductive terminal, and a capacitor connected to the intermediate node at a first electrode and one of the control lines at a second electrode, one of either the first or second compensation transistor is a P-channel transistor connected to one of the first scanning lines at a control terminal, and the other of the first or second compensation transistor is an N-channel transistor connected to one of the second scanning lines at a control terminal. The method includes driving the first and second scanning lines; and driving the control lines. The one of the second scanning lines has a potential changed from high to low level, and the one of the control lines has a potential changed from a second level to a first level, in an opposite direction to the change in the potential of the one of the second scanning lines, at a time corresponding to the change in the potential of the one of the second scanning lines.

Effect of the Disclosure

In the above display device and the method for driving the same, the potential of the one of the scanning lines (or the one of the second scanning lines) is changed from on to off level, and the potential of the one of the control lines is changed from the second level to the first level, in the opposite direction to the change in the potential of the one of the scanning lines (or the one of the second scanning lines), at a time corresponding to the change in the potential of the one of the scanning lines (or the one of the second scanning lines), thereby cancelling out the change in the potential of the intermediate node that is caused by changing the potential of the one of the scanning lines (or the one of the second scanning lines) with the change in the potential of the intermediate node that is caused by changing the potential of the one of the control lines. Thus, it is possible to prevent the potential of the intermediate node from varying when the potential of the one of the scanning lines (or the one of the second scanning lines) is changed to off level and thereby prevent display screen flickering during low-frequency drive.

DESCRIPTION OF EMBODIMENTS

Hereinafter, display devices according to various embodiments will be described with reference to the drawings. In the following descriptions, the horizontal and vertical directions in figures will be referred to as the row and column directions, respectively. When a transistor is turned on by a certain level of potential being applied to a control terminal of the transistor, the level of the potential is considered to be on level, and when the transistor is turned off, the level is considered to be off level. In the case of, for example, a P-channel transistor, low and high levels correspond to on and off levels, respectively.

First Embodiment

Figure 1:
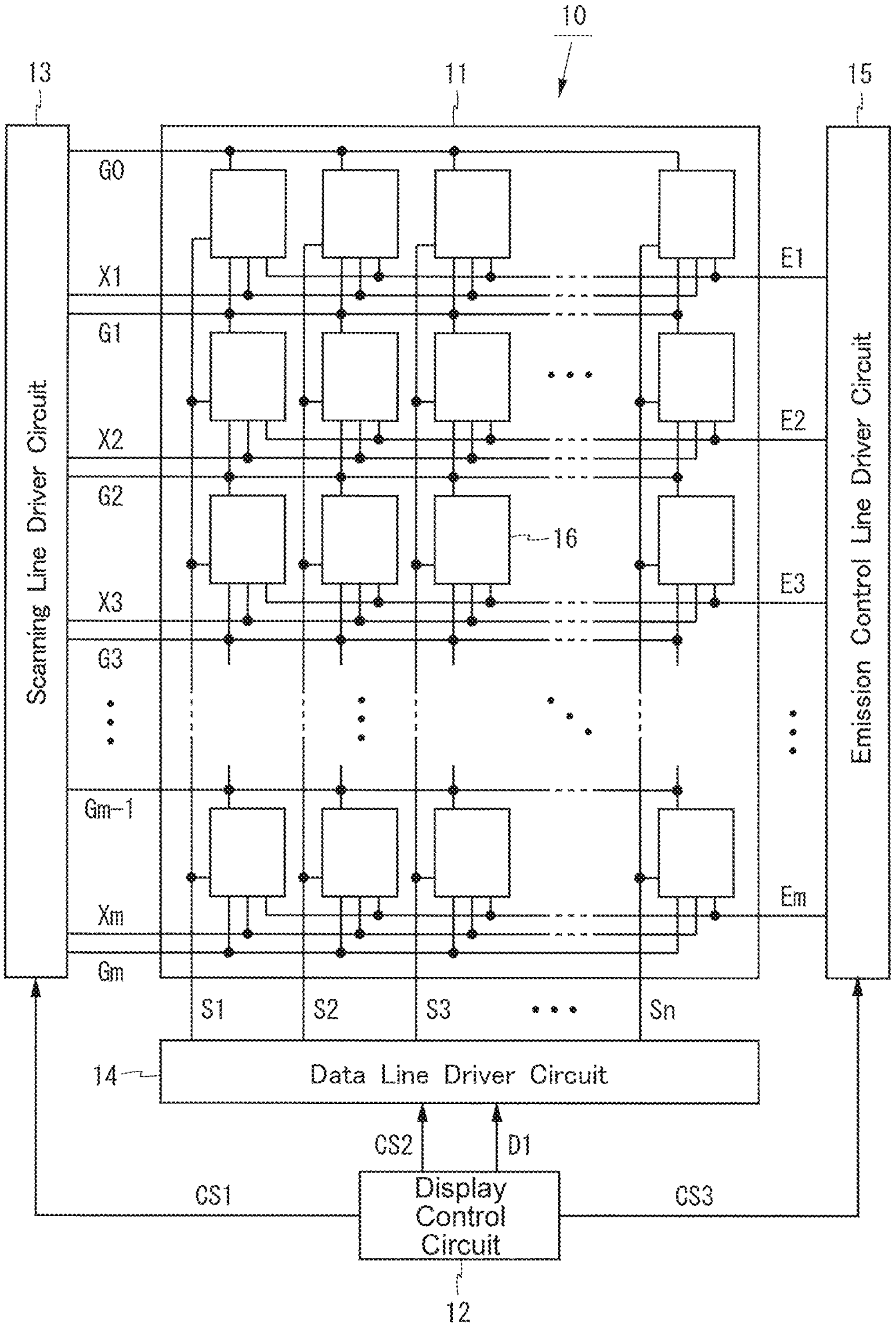
FIG. 1 is a block diagram illustrating a configuration of an organic EL display device according to a first embodiment.

FIG. 1 is a block diagram illustrating a configuration of an organic EL display device according to a first embodiment. The organic EL display device 10 shown in FIG. 1 includes a display portion 11, a display control circuit 12, a scanning line driver circuit 13, a data line driver circuit 14, and an emission control line driver circuit 15. In the following, m and n are integers of 2 or more, i is an integer from 1 to m, and j is an integer from 1 to n.

The display portion 11 includes (m+1) scanning lines G0 to Gm, n data lines S1 to Sn, m emission control lines E1 to Em, m control lines X1 to Xm, and (mXn) pixel circuits 16. The scanning lines G0 to Gm, the emission control lines E1 to Em, and the control lines X1 to Xm extend in the row direction so as to be parallel to one another. The data lines S1 to Sn extend in the column direction so as to be parallel to one another and perpendicular to the scanning lines G1 to Gm. The scanning lines G1 to Gm and the data lines S1 to Sn intersect at (mXn) points. The (mXn) pixel circuits 16 are provided corresponding to the intersection points of the scanning lines G1 to Gm and the data lines S1 to Sn. Each pixel circuit 16 is supplied with a high-level potential ELVDD, a low-level potential ELVSS, and an initialization potential VINI through unillustrated conductive members (conductors or electrodes).

The display control circuit 12 outputs a control signal CS1 to the scanning line driver circuit 13, a control signal CS2 and video signals D1 to the data line driver circuit 14, and a control signal CS3 to the emission control line driver circuit 15. The scanning line driver circuit 13 drives the scanning lines G0 to Gm and the control lines X1 to Xm based on the control signal CS1. The data line driver circuit 14 drives the data lines S1 to Sn based on the control signal CS2 and the video signals D1. The emission control line driver circuit 15 drives the emission control lines E1 to Em based on the control signal CS3.

The scanning line driver circuit 13 sequentially selects the scanning lines G0 to Gm based on the control signal CS1, and controls the potential of the scanning line that is being selected to be at on level (here, low level), while controlling the potential of the other scanning lines to be at off level (here, high level), thereby collectively selecting n pixel circuits 16 connected to the scanning line that is being selected. The scanning line driver circuit 13 controls the potential of the scanning line G0 to be at on level one horizontal period before selecting the scanning line G1.

The data line driver circuit 14 applies n potentials (hereinafter, data potentials), which correspond to the video signals D1, to the respective data lines S1 to Sn based on the control signal CS2. As a result, the n data potentials are written to the n pixel circuits 16 that are being selected. In the pixel circuits 16, organic EL elements emit light with luminances corresponding to the data potentials written in the pixel circuits 16.

For each row of pixel circuits 16, the organic EL elements are assigned emission and non-emission periods. It is assumed below that the organic EL display device 10 performs low-frequency drive at a frame frequency half as high as normal so that the organic EL elements in the pixel circuits 16 emit light twice during one frame period.

During the emission period for the organic EL elements in the i'th-row pixel circuits 16, the emission control line driver circuit 15 controls the potential of the emission control line Ei to be at on level (here, low level) based on the control signal CS3. During other periods, the potential of the emission control line Ei is controlled to be at off level (here, high level). The scanning line driver circuit 13 changes the potential of the scanning line Gi from low to high level based on the control signal CS1, and also changes the potential of the control line Xi from a level higher than low level (referred to below as a supplementary level) to low level, in the opposite direction to the change in the potential of the scanning line Gi, at a time corresponding to the change in the potential of the scanning line Gi.

Figure 2:
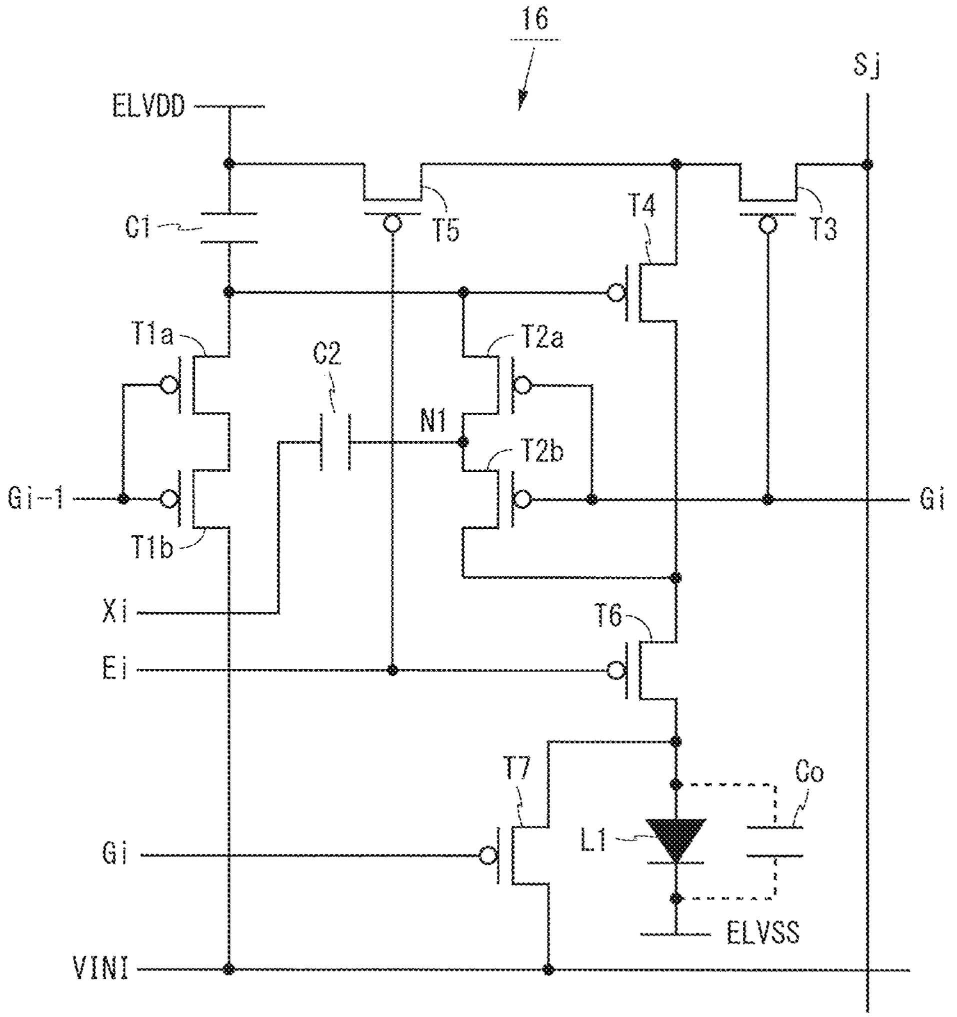
FIG. 2 is a circuit diagram of a pixel circuit in the organic EL display device shown in FIG. 1.

FIG. 2 is a circuit diagram of the pixel circuit 16. The i'th-row, j'th-column pixel circuit 16 shown in FIG. 2 is connected to the scanning lines Gi-1 and Gi, the data line Sj, the emission control line Ei, and the control line Xi. The pixel circuit 16 includes nine TFTs T1*a*, T1*b*, T2*a*, T2*b*, and T3 to T7, an organic EL element L1, and two capacitors C1 and C2. All of the TFTs T1*a*, T1*b*, T2*a*, T2*b*, and T3 to T7 are P-channel transistors formed with, for example, low-temperature polysilicon. In FIG. 2, the element denoted by reference character Co is a capacitor formed between anode and cathode terminals of the organic EL element L1.

The TFT T5 is connected at a source terminal to a conductive member having the high-level potential ELVDD applied thereto, and the conductive member is also connected to a first electrode (in FIG. 2, upper electrode) of the capacitor C1. The TFT T3 is connected to the data line Sj at a source terminal. The TFTs T3 and T5 are connected to a source terminal of the TFT T4 at respective drain terminals. The TFT T4 is connected to source terminals of the TFTs T2*b* and T6 at a drain terminal. The TFT T6 is connected at a drain terminal to a source terminal of the TFT T7 and the anode terminal of the organic EL element L1. The organic EL element L1 is connected at the cathode terminal to a conductive member having the low-level potential ELVSS applied thereto.

The TFT T2*b* is connected at a drain terminal to a source terminal of the TFT T2*a* and a first electrode (in FIG. 2, right electrode) of the capacitor C2. The TFT T2*a* is connected at a drain terminal to a gate terminal of the TFT T4, a second electrode of the capacitor C1, and a source terminal of the TFT T1*a*. The TFT Tia is connected to a source terminal of the TFT T1*b* at a drain terminal. The TFTs T1*b* and T7 are connected at respective drain terminals to a conductive member having the initialization potential VINI applied thereto. The TFTs T1*a* and T1*b* are connected to the scanning line Gi-1 at respective gate terminals. The TFTs T2*a*, T2*b*, T3, and T7 are connected to the scanning line Gi at respective gate terminals. The TFTs T5 and T6 are connected to the emission control line Ei at respective gate terminals. The capacitor C2 is connected to the control line Xi at a second electrode. Hereinafter, the node that connects the source terminal of the TFT T2*a*, the drain terminal of the TFT T2*b*, and the first electrode of the capacitor C2 will be referred to as an intermediate node N1.

In the pixel circuit 16, the organic EL element L1 functions as a light-emitting element. The TFT T4 is provided in series with the light-emitting element and functions as a drive transistor to control the amount of current flowing through the light-emitting element. The TFT T2*a* is connected to a control terminal of the drive transistor at a first conductive terminal, the intermediate node N1 at a second conductive terminal, and the scanning line Gi at a control terminal, and functions as a first compensation transistor. The TFT T2*b* is connected to the intermediate node N1 at a first conductive terminal, the drive transistor's conductive terminal close to the light-emitting element at a second conductive terminal, and the scanning line Gi at a control terminal, and functions as a second compensation transistor having the same conductivity type as the first compensation transistor.

Figure 3:
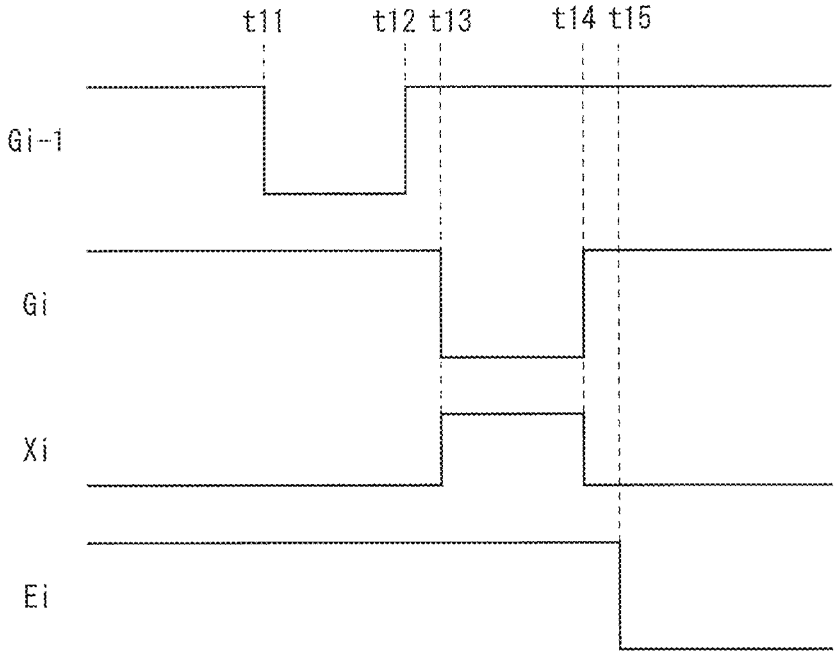
FIG. 3 is a timing chart for the organic EL display device shown in FIG. 1.

FIG. 3 is a timing chart for the organic EL display device 10. The writing of data potentials to the pixel circuits 16 and the driving of the control line Xi will be described with reference to FIG. 3. Before time t11, the scanning lines Gi-1 and Gi and the emission control line Ei have a high-level potential. Accordingly, the TFTs T1*a*, T1*b*, T2*a*, T2*b*, T3, and T5 to T7 are in an off state. Therefore, no drive current flows through the organic EL element L1, so that the organic EL element L1 emits no light.

At time t11, the potential of the scanning line Gi-1 is changed to low level. Correspondingly, the TFTs T1*a* and T1*b* are turned on, so that the gate potential of the TFT T4 becomes equal to the initialization potential VINI. The level of the initialization potential VINI is set so low that the TFT T4 is turned on after time t13. At time t12, the potential of the scanning line Gi-1 is changed to high level. Correspondingly, the TFTs T1*a* and T1*b* are turned off.

At time t13, the potential of the scanning line Gi is changed to low level. Correspondingly, the TFTs T2*a*, T2*b*, T3, and T7 are turned on. As a result of the TFT T7 being turned on, the organic EL element L1 has an anode potential equal to the initialization voltage VINI. From time t13 onward, since the TFTs T2*a*, T2*b*, and T3 are on, a current flows from the data line Sj to the gate terminal of the TFT T4 by way of the TFT T3, the TFT T4, the TFT T2*b*, and the TFT T2*a*, with the result that the gate potential of the TFT T4 is changed to a level corresponding to the potential of the data line Sj. Assuming that the potential of the data line Sj is Vd and that the TFT T4 has a threshold voltage Vth (negative value), the gate potential Vg of the TFT T4 is given by equation (1) below.

$$Vg=Vd+Vth \tag{1}$$

At time t14, the potential of the scanning line Gi is changed to high level. Correspondingly, the TFTs T2*a*, T2*b*, T3, and T7 are turned off. At time t15, the potential of the emission control line Ei is changed to low level. Correspondingly, the TFTs T5 and T6 are turned on. From time t15 onward, a drive current flows between the conductive member with the high-level potential ELVDD and the conductive member with the low-level potential ELVSS by way of the TFT T5, the TFT 14, the TFT T6, and the organic EL element L1, with the result that the organic EL element L1 emits light with a luminance corresponding to the drive current. The drive current Id is given by equation (2) below, where k is a constant.

$$\begin{aligned} Id &= k(Vg - ELVDD - Vth)^2 \\ &= k(ELVDD - Vd)^2 \end{aligned} \tag{2}$$

In this manner, the drive current Id depends on the data potential Vd but not on the threshold voltage Vth of the TFT 14. Accordingly, the organic EL element L1 emits light with a luminance corresponding to the data potential Vd, regardless of the threshold voltage Vth of the TFT 14. Thus, the organic EL display device 10 renders it possible to compensate for characteristics of the drive transistor (TFT T4) within the pixel circuit 16 (internal compensation).

The potential of the scanning line Gi is controlled to be at low level during the period from time t13 to time t14 and at high level during other periods. On the other hand, the potential of the control line Xi is controlled to be at the supplementary level during the period from time t13 to time t14 and at low level during other periods. The scanning line driver circuit 13 controls the potential of the control line Xi to be at the supplementary level for the period during which the potential of the scanning line Gi is controlled to be at low level. During the period from time t13 to time t14, the supplementary-level potential is applied to the intermediate node N1 through the control line Xi.

Figure 4:
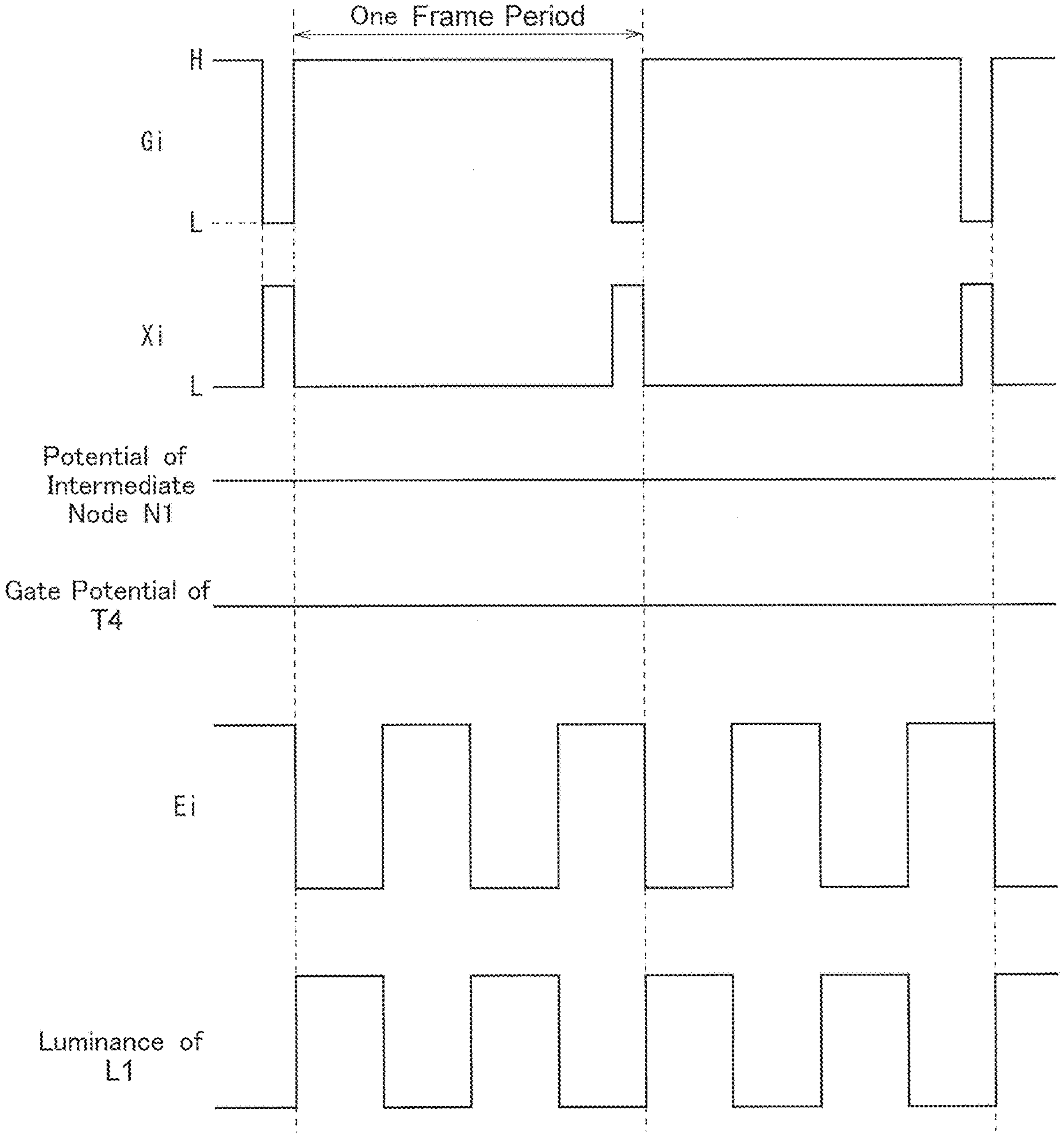
FIG. 4 is a diagram describing effects of the organic EL display device shown in FIG. 1.
Figure 11:
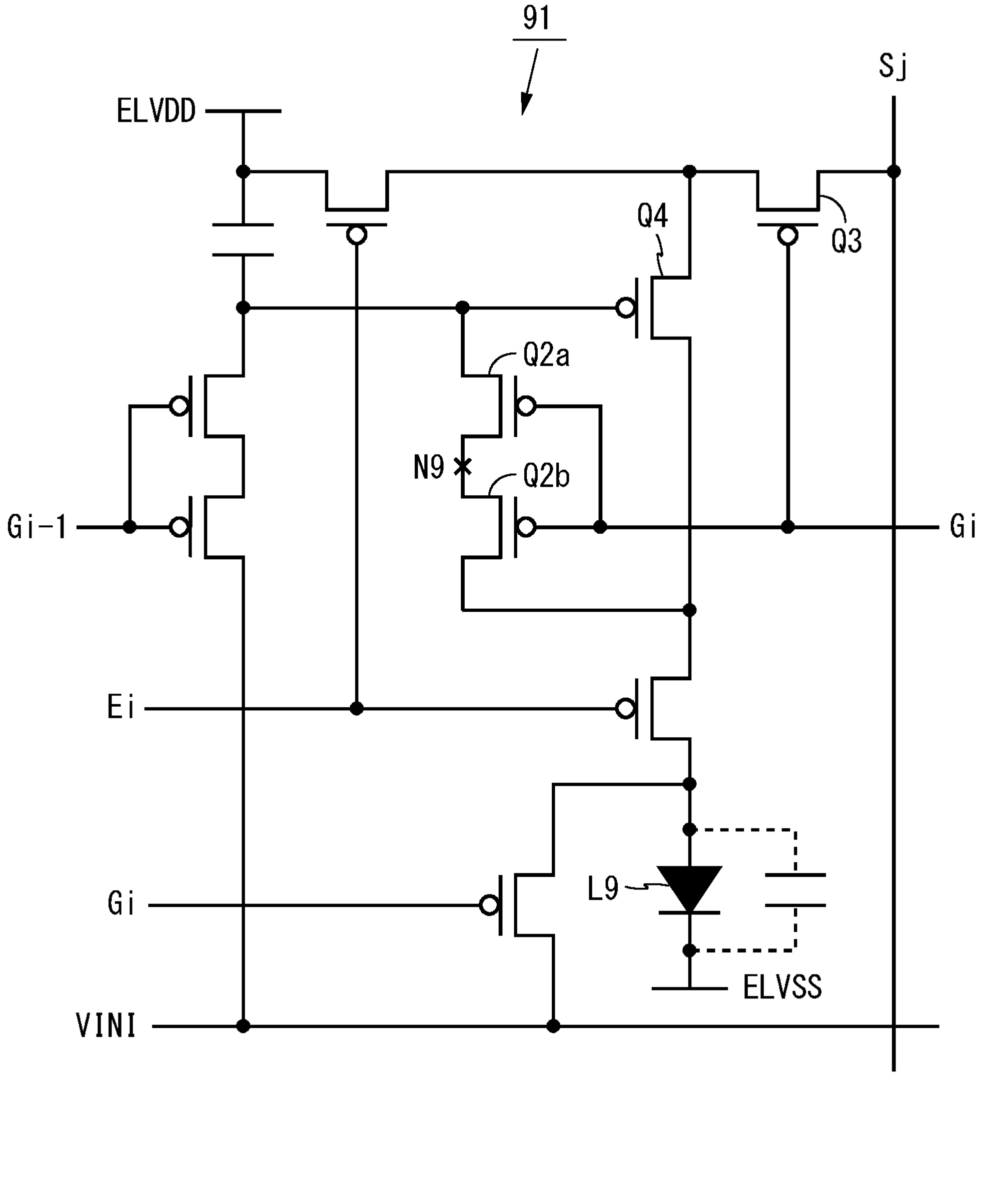
FIG. 11 Prior Art
FIG. 11 is a circuit diagram of a pixel circuit in a known organic EL display device.
Figure 12:
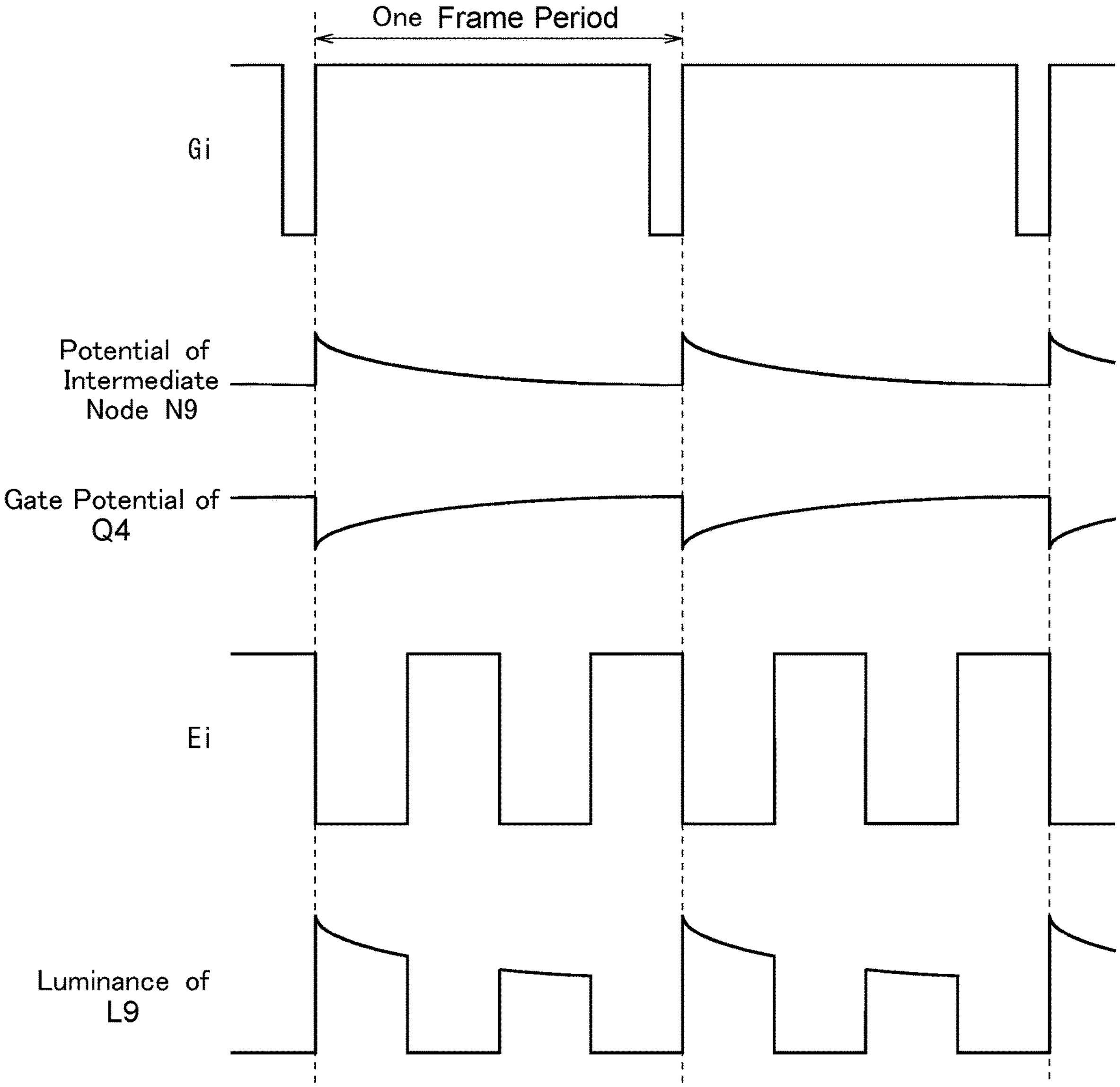
FIG. 12 Prior Art
FIG. 12 is a diagram describing a problem with the known organic EL display device.
Figure 13:
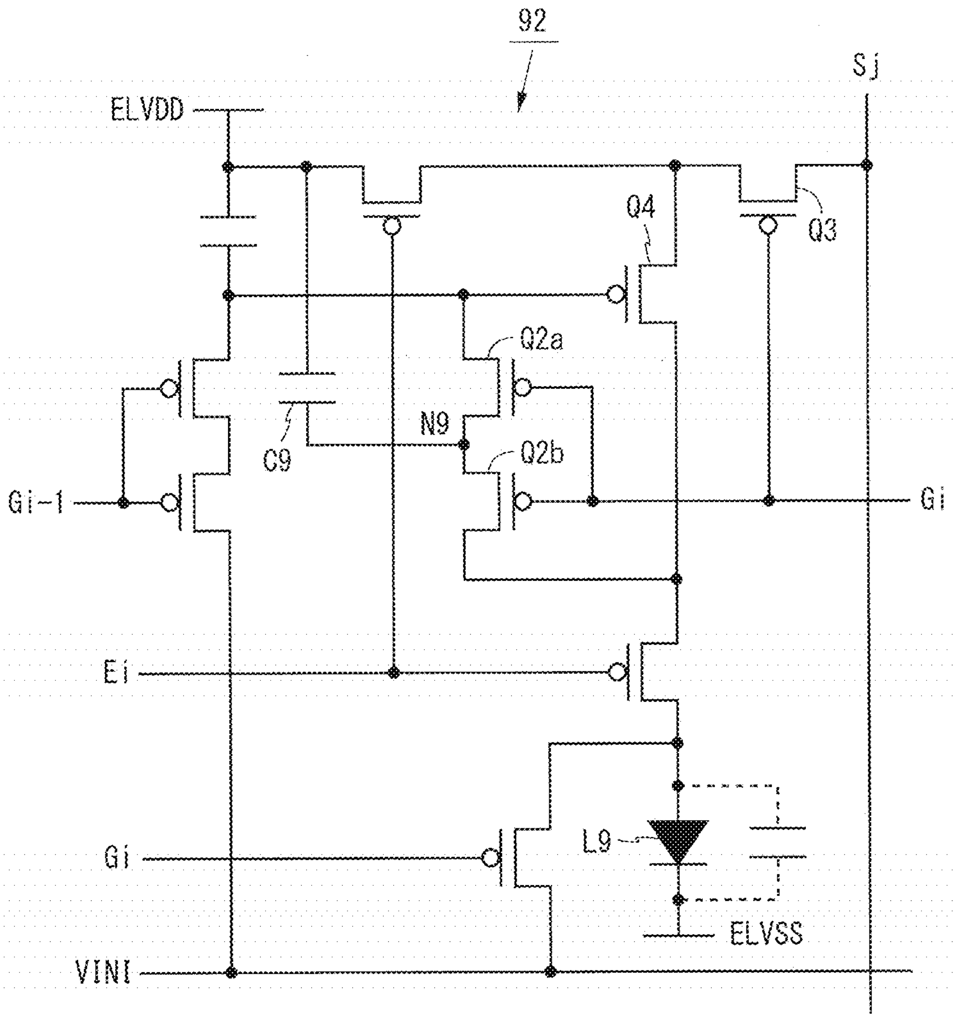
FIG. 13 is a circuit diagram of a pixel circuit in a known organic EL display device.

FIG. 4 is a diagram describing effects of the organic EL display device 10. Described below is the effect of applying the supplementary-level potential to the intermediate node N1 through the control line Xi. In the case where the known organic EL display device including the pixel circuits 91 as shown in FIG. 11 performs low-frequency drive, the potential of the intermediate node N9 varies when the potential of the scanning line Gi is changed to high level, with the result that display screen flickering occurs, as described with reference to FIG. 12. The known organic EL display device including the pixel circuits 92 as shown in FIG. 13 can also not sufficiently prevent display screen flickering during low-frequency drive.

To solve this problem, the pixel circuit 16 of the organic EL display device 10 is provided with the capacitor C2 connected to the intermediate node N1 at the first electrode and the control line Xi at the second electrode. The scanning line driver circuit 13 changes the potential of the scanning line Gi from high to low level and also changes the potential of the control line Xi from the supplementary level (higher than low level) to low level, in the opposite direction to the change in the potential of the scanning line Gi, at a time corresponding to the change in the potential of the scanning line Gi (at the same time as the change in the potential of the scanning line Gi).

When the potential of the scanning line Gi is changed from low to high level, the potential of the intermediate node N1 is pushed up to increase. To counter this, the potential of the control line Xi is changed from the supplementary level to low level, in the opposite direction to the change in the potential of the scanning line Gi, so that the potential of the intermediate node N1 is pushed down to decrease. The potential of the control line Xi is changed from the supplementary level to low level at a time corresponding to the change in the potential of the scanning line Gi from low to high level (at the same time as the change in the potential of the scanning line Gi), with the result that the increase in the potential of the intermediate node N1 due to the pushing up is canceled out with the decrease in the potential of the intermediate node N1 due to the pushing down, whereby the potential of the intermediate node N1 can be prevented from varying when the potential of the scanning line Gi is changed to high level.

The supplementary level is determined depending on, for example, the configuration of the pixel circuit 16, such that the potential of the intermediate node N1 can be prevented from varying when the potential of the scanning line Gi is changed to high level. So long as such a variation in potential can be prevented, the supplementary level may be set lower than, equal to, or higher than high level. In the case shown in FIGS. 3 and 4, the supplementary level is lower than high level.

In the case of the pixel circuit 16, the potential of the intermediate node N1 does not vary when the potential of the scanning line Gi is changed to high level. Accordingly, neither the potential of the intermediate node N1 nor the gate potential of the TFT Q4 varies until the next time the potential of the scanning line Gi is changed to low level. Therefore, even in the case where the organic EL display device 10 performs low-frequency drive so that the organic EL element L1 emits light a plurality of times (here, twice) during one frame period, the organic EL element L1 emits light with the same luminance during all emission periods. Thus, the organic EL display device 10 according to the present embodiment renders it possible to prevent display screen flickering during low-frequency drive.

As described above, the organic EL display device 10 according to the present embodiment includes the display portion 11, which includes the scanning lines G0 to Gm, the control lines X1 to Xm, and the pixel circuits 16, and the driver circuit (scanning line driver circuit 13) configured to drive the scanning lines G0 to Gm and the control lines X1 to Xm. The pixel circuit 16 includes the light-emitting element (organic EL element L1), the drive transistor (TFT T4) provided in series with the light-emitting element to control the amount of current flowing through the light-emitting element, the first compensation transistor (TFT T2*a*) connected to the control terminal (gate terminal) of the drive transistor at the first conductive terminal (drain terminal), the intermediate node N1 at the second conductive terminal (source terminal), and the scanning line Gi at the control terminal (gate terminal), the second compensation transistor (TFT T2*b*) having the same conductivity type (P-type) as the first compensation transistor and connected to the intermediate node N1 at the first conductive terminal (drain terminal), the drive transistor's conductive terminal (drain terminal) close to the light-emitting element at the second conductive terminal (source terminal), and the scanning line Gi at the control terminal (gate terminal), and the capacitor C2 connected to the intermediate node N1 at the first electrode and the control line Xi at the second electrode. The driver circuit changes the potential of the scanning line Gi from on (low) to off (high) level and also changes the potential of the control line Xi from the second level (supplementary level higher than low level) to the first level (low level), in the opposite direction to the change in the potential of the scanning line Gi, at a time corresponding to the change in the potential of the scanning line Gi (at the same time as the change in the potential of the scanning line Gi). The driver circuit controls the potential of the control line Xi to be at the second level for the period during which the potential of the scanning line Gi is controlled to be at on level.

In the case of the organic EL display device 10 according to the present embodiment, the potential of the scanning line Gi is changed from on to off level, and the potential of the control line Xi is changed from the second level to the first level, in the opposite direction to the change in the potential of the scanning line Gi, at a time corresponding to the change in the potential of the scanning line Gi, whereby the increase in the potential of the intermediate node N1 that is caused by changing the potential of the scanning line Gi can be canceled out with the decrease in the potential of the intermediate node N1 that is caused by changing the potential of the control line Xi. Thus, it is possible to prevent the potential of the intermediate node N1 from varying when the potential of the scanning line Gi is changed to off level and thereby prevent display screen flickering during low-frequency drive.

Figure 5:
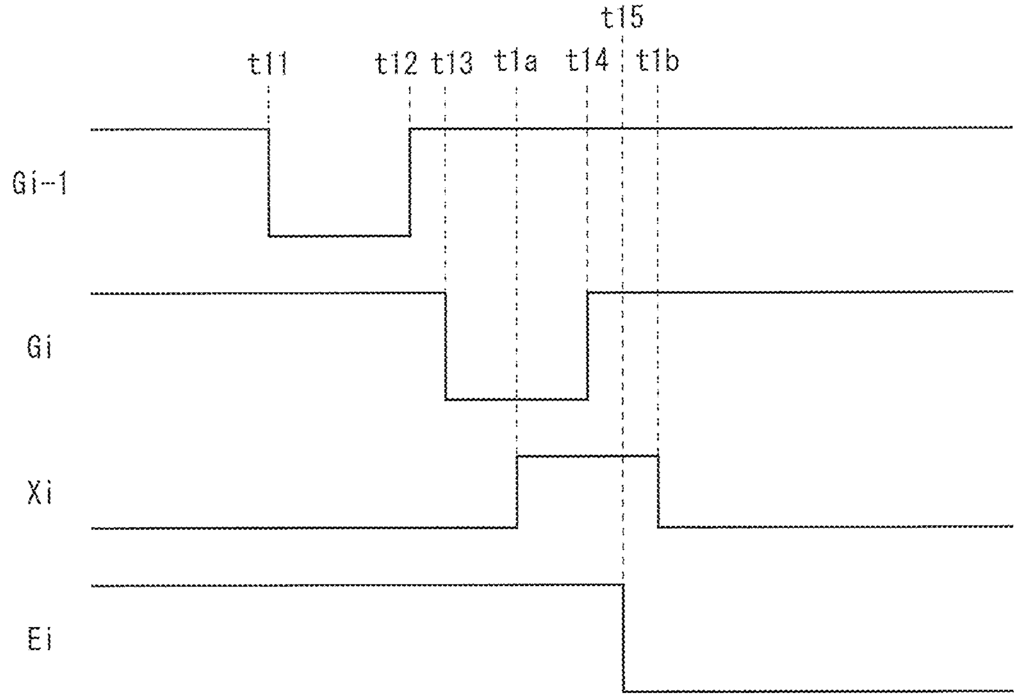
FIG. 5 is a timing chart for an organic EL display device according to a first variant.

For the organic EL display device 10 according to the present embodiment, variants can be configured as below. FIG. 5 is a timing chart for an organic EL display device according to a first variant. In FIG. 5, the potential of the scanning line Gi is changed from high to low level at time t13, the potential of the control line Xi is then changed from low level to the supplementary level at time t1*a*, the potential of the scanning line Gi is then changed from low to high level at time t14, and the potential of the control line Xi is then changed from the supplementary level to low level at time t1*b*. The duration (t1*b*-t1*a*) of the period during which the potential of the control line Xi is at the supplementary level is equal to the duration (t14-*t*13) of the period during which the potential of the scanning line Gi is at low level.

In the organic EL display device according to the first variant, the driver circuit changes the potential of the scanning line Gi from off (high) to on (low) level, then changes the potential of the control line Xi from the first level (low level) to the second level (supplementary level), then changes the potential of the scanning line Gi from on to off level, and then changes the potential of the control line Xi from the second level to the first level. The potential of the control line Xi is at the second level for the same duration as the period during which the potential of the scanning line Gi is at on level.

Figure 6:
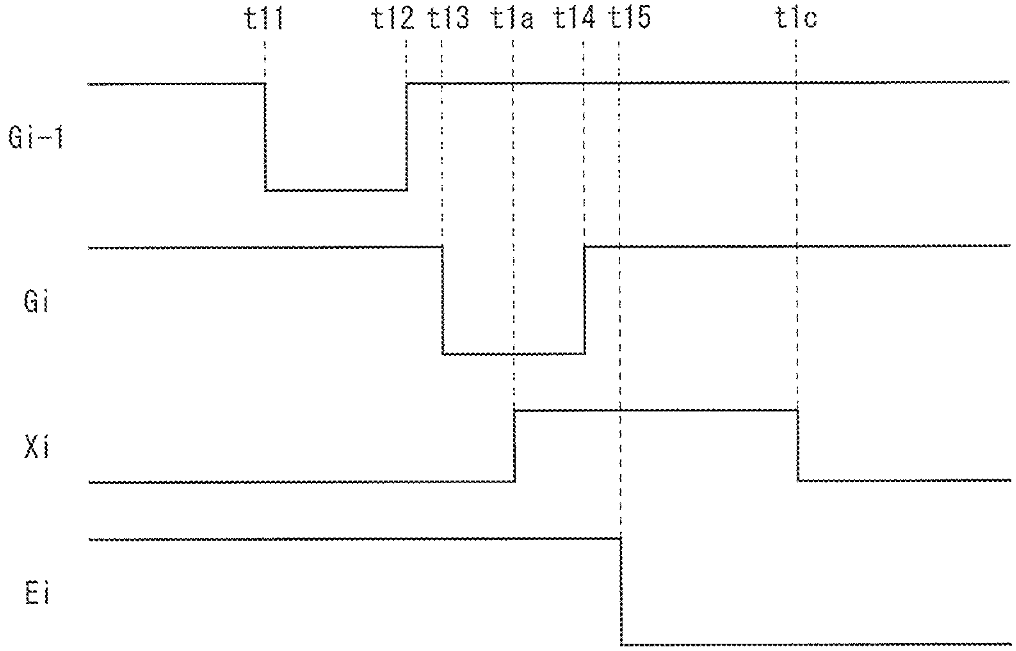
FIG. 6 is a timing chart for an organic EL display device according to a second variant.

FIG. 6 is a timing chart for an organic EL display device according to a second variant. In FIG. 6, the potential of the control line Xi is at the supplementary level during the period from time t1*a* to time t1*c*. Time t1*c* is later than time t1*b*. The duration (t1*c*-t1*a*) of the potential of the control line Xi is at the supplementary level is longer than the duration (t14-*t*13) of the period during which the potential of the scanning line Gi is at low level.

In the organic EL display device according to the second variant, the driver circuit changes the potentials of the scanning line Gi and the control line Xi in the same order as in the case of the organic EL display device according to the first variant. The potential of the control line Xi is at the second level (supplementary level) for a period longer than the period during which the potential of the scanning line Gi is at on (low) level.

In the case of the organic EL display devices according to the first and second variants, as in the case of the organic EL display device 10 according to the first embodiment, the supplementary level is suitably determined so as to prevent the potential of the intermediate node N1 from varying when the potential of the scanning line Gi is changed to off level and thereby prevent display screen flickering during low-frequency drive.

Second Embodiment

Figure 7:
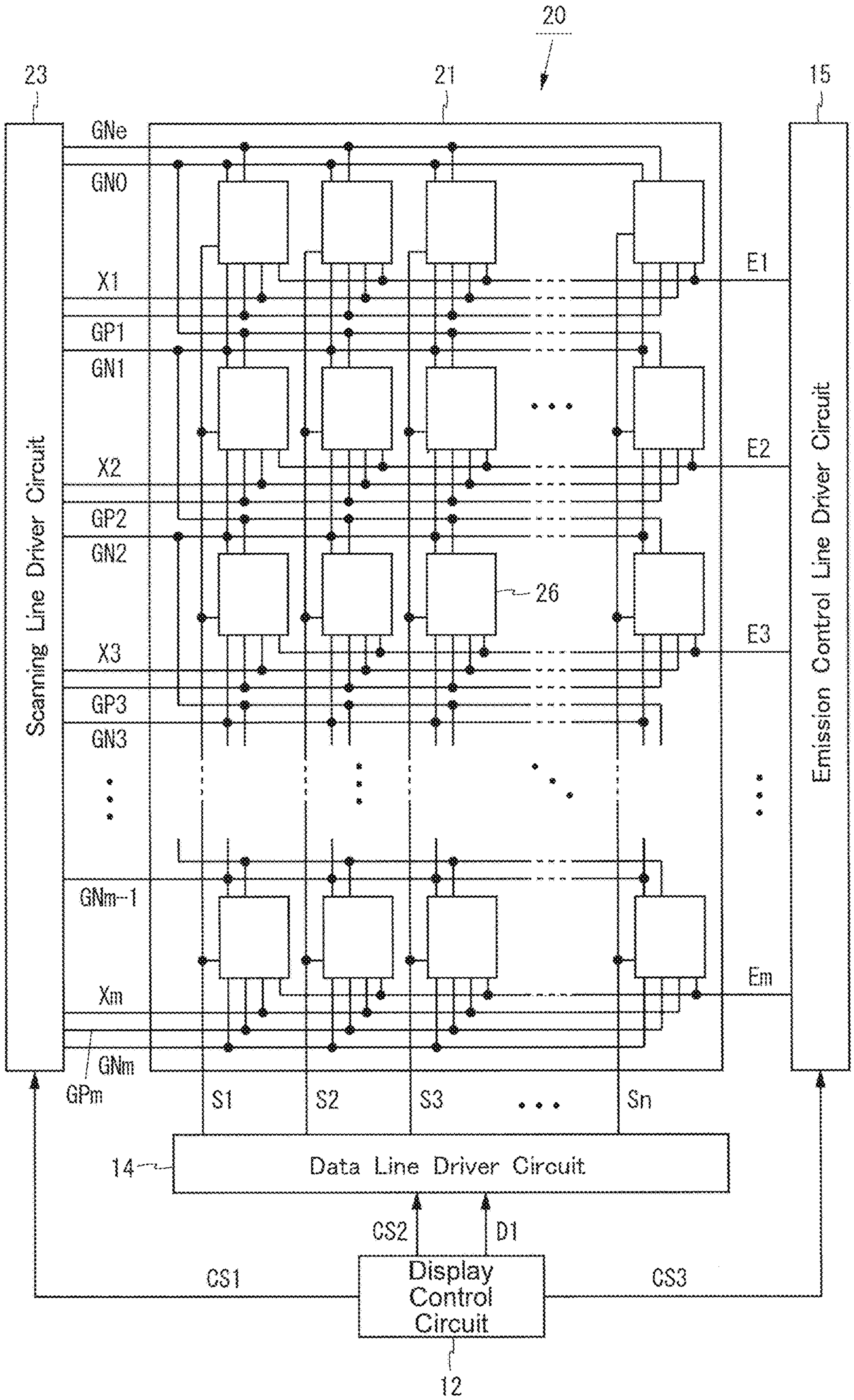
FIG. 7 is a block diagram illustrating a configuration of an organic EL display device according to a second embodiment.

FIG. 7 is a block diagram illustrating a configuration of an organic EL display device according to a second embodiment. The organic EL display device 20 shown in FIG. 7 includes a display portion 21, a display control circuit 12, a scanning line driver circuit 23, a data line driver circuit 14, and an emission control line driver circuit 15. In the present embodiment, the same elements as those in the first embodiment are denoted by the same reference characters and will not be elaborated upon. Differences from the first embodiment will be described below.

The display portion 21 includes (2m+2) scanning lines GP1 to GPm, GNe, and GN0 to GNm, n data lines S1 to Sn, m emission control lines E1 to Em, m control lines X1 to Xm, and (mXn) pixel circuits 26. The scanning lines GP1 to GPm, GNe, and GN0 to GNm, the emission control lines E1 to Em, and the control lines X1 to Xm extend in the row direction so as to be parallel to one another. The data lines S1 to Sn extend in the column direction so as to be parallel to one another and perpendicular to the scanning lines GP1 to GPm. The scanning lines GP1 to GPm and the data lines S1 to Sn intersect at (mXn) points. The (mXn) pixel circuits 26 are provided corresponding to the intersection points of the scanning lines GP1 to GPm and the data lines S1 to Sn.

The scanning line driver circuit 23 is configured to drive the scanning lines GP1 to GPm, GNe, and GN0 to GNm and the control lines X1 to Xm based on a control signal CS1 outputted by the display control circuit 12. Specifically, based on the control signal CS1, the scanning line driver circuit 23 sequentially selects the scanning lines GP1 to GPm and the scanning lines GN1 to GNm, and controls the potential of the scanning line being selected to be at on level while controlling the other scanning lines to be at off level. The scanning line driver circuit 23 controls the potential of the scanning line G0 to be at on level one horizontal period before selecting the scanning line G1. The scanning line driver circuit 23 controls the potential of the scanning line Ge to be at on level two horizontal periods before selecting the scanning line G1. For the potentials of the scanning lines GP1 to GPm, on and off levels correspond to low and high levels, respectively. For the potentials of the scanning lines GNe and GN0 to GNm, on and off levels correspond to high and low levels, respectively.

By the operation of the scanning line driver circuit 23 and the data line driver circuit 14, n pixel circuits 26 connected to the scanning line being selected are collectively selected, and the n pixel circuits 26 being selected have n respective data potentials written thereto. The scanning line driver circuit 23 changes the potential of the scanning line GNi from high to low level based on the control signal CS1, and also changes the potential of the control line Xi from a level lower than high level (referred to below as a supplementary level) to high level, in the opposite direction to the change in the potential of the scanning line GNi, at a time corresponding to the change in the potential of the scanning line GNi.

Figure 8:
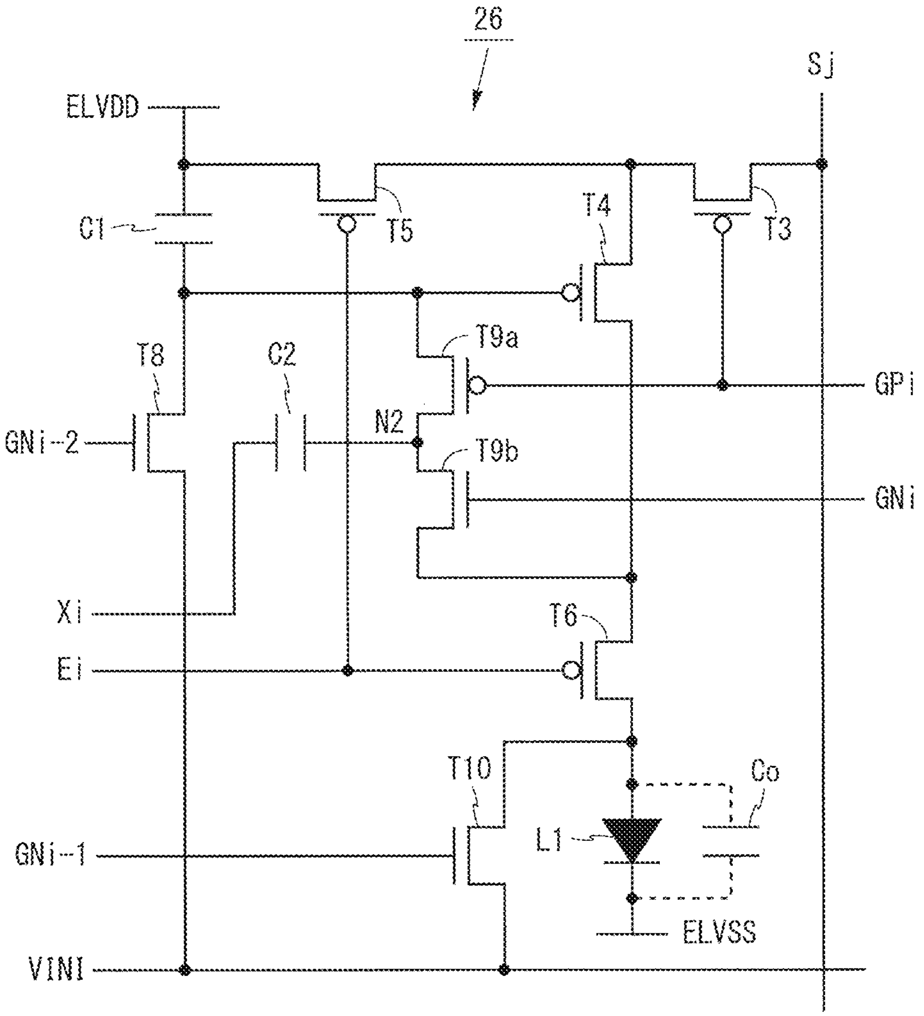
FIG. 8 is a circuit diagram of a pixel circuit in the organic EL display device according to the second embodiment.

FIG. 8 is a circuit diagram of the pixel circuit 26. The i'th-row, j'th-column pixel circuit 26 shown in FIG. 8 is connected to the scanning lines GPi, GNi-2, GNi-1, and GNi, the data line Sj, the emission control line Ei, and the control line Xi. The pixel circuit 26 includes eight TFTs T3 to T6, T8, T9*a*, T9*b*, and T10, an organic EL element L1, and two capacitors C1 and C2. The TFTs T3 to T6 and T9*a* are P-channel transistors formed with, for example, low-temperature polysilicon. The TFTs T8, T9*b*, and T10 are N-channel transistors formed with, for example, an oxide semiconductor, such as indium gallium zinc oxide.

The pixel circuit 26 differs in the following points from the pixel circuit 16 according to the first embodiment. The pixel circuit 26 includes the TFT T8 in place of the TFTs T1*a* and T1*b*, the TFTs T9*a* and T9*b* in place of the TFTs T2*a* and T2*b*, and the TFT T10 in place of the TFT T7. The TFT T4 is connected at a drain terminal to a source terminal of the TFT T6 and a drain terminal of the TFT T9*b*. The TFT T6 is connected at a drain terminal to a drain terminal of the TFT T10 and an anode terminal of the organic EL element L1.

The TFT T9*b* is connected at a source terminal to a source terminal of the TFT T9*a* and a first electrode (in FIG. 8, right electrode) of the capacitor C2. The TFT T9*a* is connected at a drain terminal to a gate terminal of the TFT T4, a second electrode of the capacitor C1, and a drain terminal of the TFT T8. The TFTs T8 and T10 are connected at respective source terminals to a conductive member having an initialization potential VINI applied thereto. The TFTs T3 and T9*a* are connected to the scanning line GPi at respective gate terminals. The TFT T8 is connected to the scanning line GNi-2 at a gate terminal. The TFT T10 is connected to the scanning line GNi-1 at a gate terminal. The TFT T9*b* is connected to the scanning line GNi at a gate terminal. The node that connects the source terminals of the TFTs T9*a* and T9*b* and the first electrode of the capacitor C2 will be referred to below as an intermediate node N2.

In the pixel circuit 26, the TFT T9*a* is a P-channel transistor functioning as a first compensation transistor and connected to a control terminal of the drive transistor (TFT T4) at a first conductive terminal, the intermediate node N2 at a second conductive terminal, and the first scanning line (scanning line GPi) at a control terminal. The TFT T9*b* is an N-channel transistor functioning as a second compensation transistor and connected to the intermediate node N2 at a first conductive terminal, the drive transistor's conductive terminal close to the light-emitting element at a second conductive terminal, and the second scanning line (scanning line GNi) at a control terminal.

Figure 9:
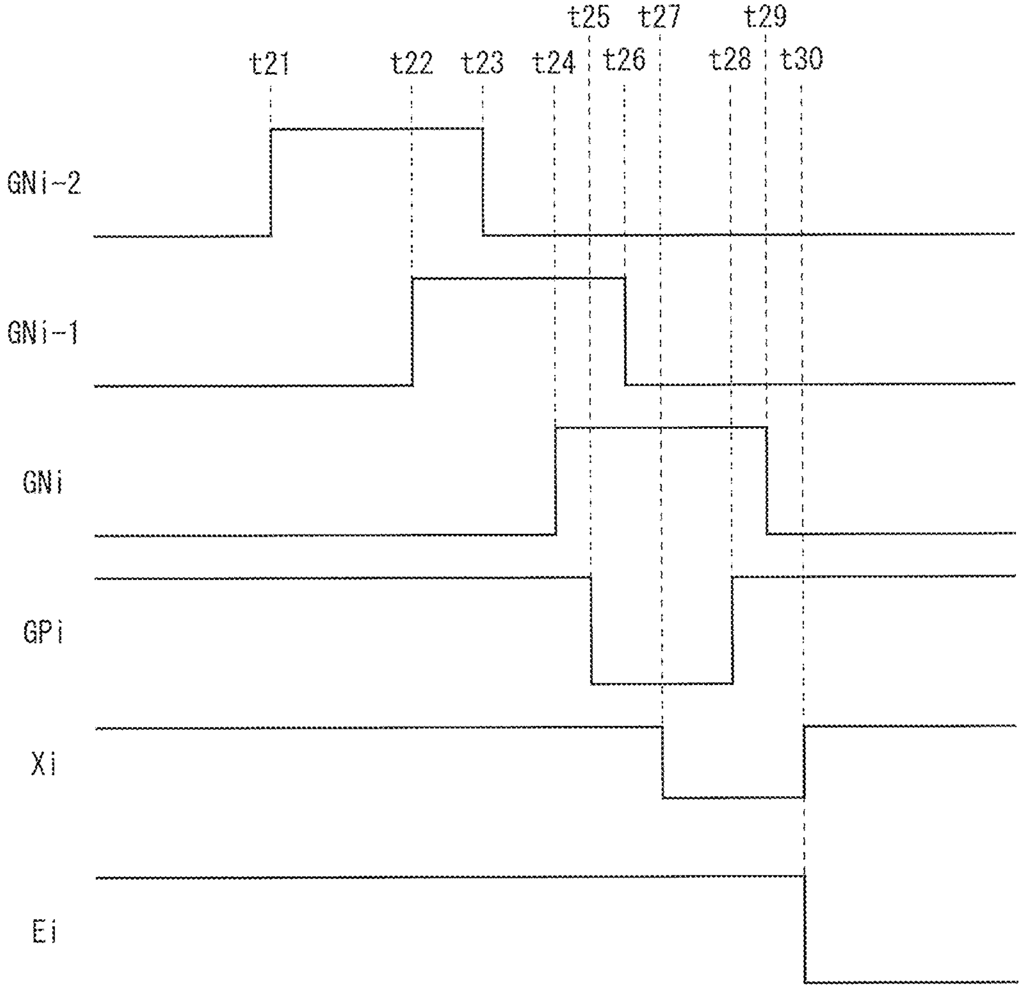
FIG. 9 is a timing chart for the organic EL display device according to the second embodiment.

FIG. 9 is a timing chart for the organic EL display device 20. The writing of data potentials to the pixel circuits 26 and the driving of the control line Xi will be described with reference to FIG. 9. Before time t21, the scanning lines GNi-2, GNi-1, and GNi have a low-level potential, and the scanning line GPi and the emission control line Ei have a high-level potential. Accordingly, the TFTs T3, T5, T6, T8, T9*a*, T9*b*, and T10 are in an off state. Therefore, no drive current flows through the organic EL element L1, so that the organic EL element L1 emits no light.

At time t21, the potential of the scanning line GNi-2 is changed to high level. Correspondingly, the TFT T8 is turned on, so that the gate potential of the TFT T4 becomes equal to the initialization potential VINI. The level of the initialization potential VINI is set so low that the TFT T4 is turned on after time t25. At time t22, the potential of the scanning line GNi-1 is changed to high level. Correspondingly, the TFT T10 is turned on, so that the organic EL element L1 has an anode potential equal to the initialization potential VINI.

At time t23, the potential of the scanning line GNi-2 is changed to low level. Correspondingly, the TFT T8 is turned off. At time t24, the potential of the scanning line GNi is changed to high level. Correspondingly, the TFT T9*b* is turned on.

At time t25, the potential of the scanning line GPi is changed to low level. Correspondingly, the TFTs T3 and T9*a* are turned on. From time t25 onward, a current flows from the data line Sj to the gate terminal of the TFT 14 by way of the TFT T3, the TFT T4, the TFT T9*b*, and the TFT T9*a*, with the result that the potential at the gate terminal of the TFT T4 increases to a level corresponding to the potential of the data line Sj. The gate potential Vg of the TFT T4 is given by equation (1) shown earlier.

At time t26, the potential of the scanning line GNi-1 is changed to low level. Correspondingly, the TFT T10 is turned off. At time t28, the potential of the scanning line GPi is changed to high level. Correspondingly, the TFTs T3 and T9*a* are turned off. At time t29, the potential of the scanning line GNi is changed to low level. Correspondingly, the TFT T9*b* is turned off.

At time t30, the potential of the emission control line Ei is changed to low level. Correspondingly, the TFTs T5 and T6 are turned on. From time t30 onward, a drive current flows between a conductive member having a high-level potential ELVDD applied thereto and a conductive member having a low-level potential ELVSS applied thereto, by way of the TFT T5, the TFT 14, the TFT T6, and the organic EL element L1, with the result that the organic EL element L1 emits light with a luminance corresponding to the drive current. The drive current Id is given by equation (2). Thus, as in the first embodiment, the organic EL element L1 emits light with a luminance corresponding to the data potential Vd, regardless of the threshold voltage Vth of the TFT 14.

The potential of the scanning line GPi is controlled to be at low level during the period from time t25 to time t28 and at high level during other periods. The potential of the scanning line GNi is controlled to be at high level during the period from time t24 to time t29 and at low level during other periods. On the other hand, the potential of the control line Xi is controlled to be at the supplementary level during the period from time t27 to time t30 and at high level during other periods. During the period from time t27 to time t30, the supplementary-level potential is applied to the intermediate node N2 through the control line Xi.

In FIG. 9, the potential of the scanning line GNi is changed from low to high level at time t24, the potential of the scanning line GPi is then changed from high to low level at time t25, the potential of the control line Xi is then changed from high to the supplementary level at time t27, the potential of the scanning line GPi is then changed from low to high level at time t28, the potential of the scanning line GNi is then changed from high to low level at time t29, and the potential of the control line Xi is then changed from the supplementary level to high level at time t30. The duration (t30-*t*27) of the period during which the potential of the control line Xi is at the supplementary level is equal to the duration (t28-*t*25) of the period during which the potential of the scanning line GPi is at low level.

Described below is the effect of applying the supplementary-level potential to the intermediate node N2 through the control line Xi in the organic EL display device 20. In the case of the pixel circuit 26, both the TFTs T9*a* and T9*b* are in an on state during the period from time t25 to time t28. The TFT T9*a* is turned off when the potential of the scanning line GPi is changed to high level at time t28. After time t28, the TFT T9*b* continues to be in the on state, and therefore the intermediate node N2 is not brought into a floating state and hence does not change in potential.

The TFT T9*b* is turned off when the potential of the scanning line GNi is changed to low level at time t29. As a result of the TFT T9*b* being turned off following the turn off of the TFT T9*a*, the intermediate node N2 is brought into a floating state. When the potential of the scanning line GNi is changed to low level, the potential of the intermediate node N2 is pushed down to decrease. The TFT T9*a* is a P-channel thin-film transistor, which is formed using, for example, low-temperature polysilicon and does not have as good an off characteristic as an N-channel thin-film transistor formed using an oxide semiconductor. Therefore, if no special countermeasures are taken, leakage current flows through the TFT T9*a*, with the result that the potential of the intermediate node N2 gradually increases, and the gate potential of the TFT T4 gradually decreases. The luminance of the organic EL element L1 increases within one frame period, leading to display screen flickering during low-frequency drive.

To solve this problem, the pixel circuit 26 of the organic EL display device 20 is provided with the capacitor C2 connected to the intermediate node N2 at the first electrode and the control line Xi at the second electrode. The scanning line driver circuit 23 changes the potential of the scanning line GNi from high to low level and also changes the potential of the control line Xi from the supplementary level (lower than high level) to high level, in the opposite direction to the change in the potential of the scanning line GNi, at a time corresponding to the change in the potential of the scanning line GNi (approximately at the same time as the change in the potential of the scanning line GNi).

When the potential of the scanning line GNi is changed from high to low level, the potential of the intermediate node N2 is pushed down to decrease. To counter this, the potential of the control line Xi is changed from the supplementary level to high level, in the opposite direction to the change in the potential of the scanning line GNi, with the result that the potential of the intermediate node N2 is pushed up to increase. The potential of the control line Xi is changed from the supplementary level to high level at a time corresponding to the change in the potential of the scanning line GNi from high to low level (approximately at the same time as the change in the potential of the scanning line GNi), with the result that the decrease in the potential of the intermediate node N2 due to the pushing down is canceled out with the increase in the potential of the intermediate node N2 due to the pushing up, whereby the potential of the intermediate node N2 can be prevented from varying when the potential of the scanning line GNi is changed to low level. Thus, the organic EL display device 20 according to the embodiment renders it possible to prevent display screen flickering during low-frequency drive in the same manner as in the first embodiment.

As described above, the organic EL display device 20 according to the present embodiment includes the display portion 21, which includes the first scanning lines (scanning lines GP1 to GPm), the second scanning lines (scanning lines GNe and GN0 to GNm), the control lines X1 to Xm, and the pixel circuits 26, and the driver circuit (scanning line driver circuit 23) configured to drive the first scanning lines, the second scanning lines, and the control lines. The pixel circuit 26 includes the light-emitting element (organic EL element L1), the drive transistor (TFT T4) provided in series with the light-emitting element to control the amount of current flowing through the light-emitting element, the P-channel transistor (TFT T9*a*) serving as the first compensation transistor and connected to the control terminal (gate terminal) of the drive transistor at the first conductive terminal (drain terminal), the intermediate node N2 at the second conductive terminal (source terminal), and the first scanning line (scanning line GPi) at the control terminal (gate terminal), the N-channel transistor (TFT T9*b*) serving as the second compensation transistor and connected to the intermediate node N2 at the first conductive terminal (source terminal), the drive transistor's conductive terminal (drain terminal) close to the light-emitting element at the second conductive terminal (drain terminal), and the second scanning line (scanning line GNi) at the control terminal (gate terminal), and the capacitor C2 connected to the intermediate node N2 at the first electrode and the control line Xi at the second electrode. The driver circuit changes the potential of the second scanning line from high to low level and also changes the potential of the control line Xi from the second level (supplementary level lower than high level) to the first level (high level), in the opposite direction to the change in the potential of the second scanning line, at a time corresponding to the change in the potential of the second scanning line.

The driver circuit changes the potential of the second scanning line from low to high level, then changes the potential of the control line Xi from the first level to the second level, then changes the potential of the second scanning line from high to low level, and then changes the potential of the control line Xi from the second level to the first level. Moreover, the driver circuit changes the potential of the second scanning line from low to high level, then changes the potential of the first scanning line from high to low level, then changes the potential of the first scanning line from low to high level, and then changes the potential of the second scanning line from high to low level. Further, the driver circuit changes the potential of the second scanning line from low to high level, then changes the potential of the first scanning line from high to low level, then changes the potential of the control line Xi from the first level to the second level, then changes the potential of the first scanning line from low to high level, then changes the potential of the second scanning line from high to low level, and then changes the potential of the control line Xi from the second level to the first level. The potential of the control line Xi is at the second level for the same duration as the period during which the potential of the first scanning line is at on level.

In the case of the organic EL display device 20 according to the present embodiment, the potential of the second scanning line is changed from on to off level, and the potential of the control line Xi is changed from the second level to the first level, in the opposite direction to the change in the potential of the second scanning line, at a time corresponding to the change of the potential of the second scanning line, whereby the decrease in the potential of the intermediate node N2 that is caused by changing the potential of the second scanning line can be canceled out with the increase in the potential of the intermediate node N2 that is caused by changing the potential of the control line Xi. Thus, it is possible to prevent the potential of the intermediate node N2 from varying when the potential of the second scanning line is changed to off level and thereby prevent display screen flickering during low-frequency drive.

Third Embodiment

An organic EL display device according to a third embodiment has the same configuration as the organic EL display device 20 according to the second embodiment (FIG. 7). However, in the organic EL display device according to the present embodiment, the display portion includes pixel circuits as described below, in place of the pixel circuits 26. Differences from the second embodiment will be described below.

Figure 10:
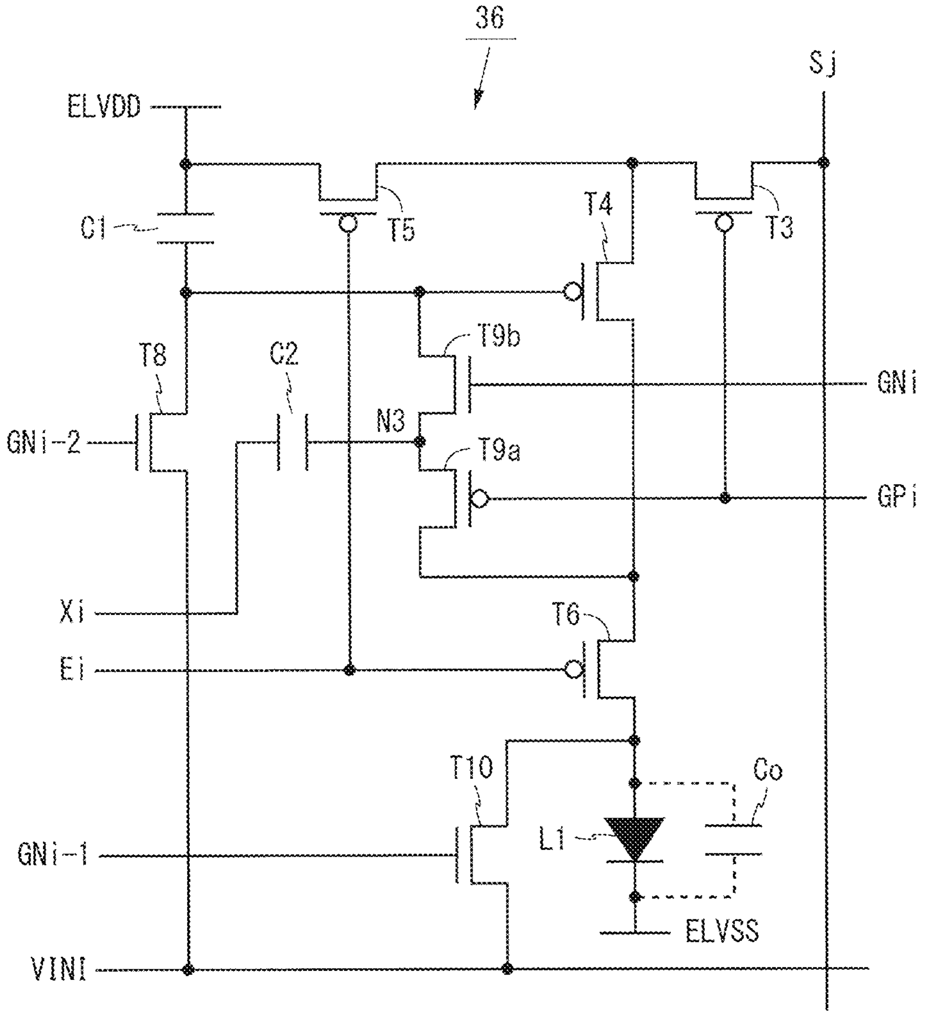
FIG. 10 is a circuit diagram of a pixel circuit in an organic EL display device according to a third embodiment.

FIG. 10 is a circuit diagram of the pixel circuit in the organic EL display device according to the present embodiment. In the i'th-row, j'th-column pixel circuit 36 shown in FIG. 10, the TFTs T9*a* and T9*b* are switched in position compared to the pixel circuit 26 shown in FIG. 8. The TFT T4 is connected to the source terminals of the TFTs T6 and T9*a* at the drain terminal. The TFT T9*a* is connected at the drain terminal to the drain terminal of the TFT T9*b* and the first electrode (in FIG. 10, right electrode) of the capacitor C2. The TFT T9*b* is connected at the source terminal to the gate terminal of the TFT T4, the second electrode of the capacitor C1, and the drain terminal of the TFT T8. The node that connects the drain terminals of the TFTs T9*a* and T9*b* and the first electrode of the capacitor C2 will be referred to below as an intermediate node N3.

In the pixel circuit 36, the TFT T9*b* is an N-channel transistor functioning as a first compensation transistor and connected to the control terminal of the drive transistor (TFT T4) at the first conductive terminal, the intermediate node N3 at the second conductive terminal, and the second scanning line (scanning line GNi) at the control terminal. The TFT T9*a* is a P-channel transistor functioning as a second compensation transistor and connected to the intermediate node N3 at the first conductive terminal, the drive transistor's conductive terminal close to the light-emitting element at the second conductive terminal, and the first scanning line (scanning line GPi) at the control terminal.

The organic EL display device according to the present embodiment operates as shown in the timing chart in FIG. 9. The potential of the scanning line GPi is controlled to be at low level during the period from time t25 to time t28 and at high level during other periods. The potential of the scanning line GNi is controlled to be at high level during the period from time t24 to time t29 and at low level during other periods. Correspondingly, the potential of the control line Xi is controlled to be at the supplementary level during the period from time t27 to time t30 and at high level during other periods. The pixel circuit 36 operates in a similar manner to the pixel circuit 26.

Described below is the effect of applying the supplementary-level potential to the intermediate node N3 through the control line Xi in the organic EL display device according to the present embodiment. In the case of the pixel circuit 36, both the TFTs T9*a* and T9*b* are in an on state during the period from time t25 to time t28. The TFT T9*a* is turned off when the potential of the scanning line GPi is changed to high level at time t28. After time t28, the TFT T9*b* continues to be in the on state, so that the intermediate node N3 is electrically connected to the gate terminal of the TFT T4. The gate potential of the TFT T4 is unlikely to vary, and therefore the potential of the intermediate node N3 barely changes.

The TFT T9*b* is turned off when the potential of the scanning line GNi is changed to low level at time t29. As a result of the TFT T9*b* being turned off following the turn off of the TFT T9*a*, the intermediate node N3 is brought into a floating state. When the potential of the scanning line GNi is changed to low level, the potential of the intermediate node N3 is pushed down to decrease. The TFT T9*a* is a P-channel thin-film transistor, which is formed using, for example, low-temperature polysilicon and does not have as good an off characteristic as an N-channel thin-film transistor formed using an oxide semiconductor. Therefore, if no special countermeasures are taken, leakage current flows through the TFT T9*a*, with the result that the potential of the intermediate node N3 gradually increases. There is parasitic capacitance (not shown) between the drain and source terminals of the TFT T9*b*, and therefore as the potential of the intermediate node N3 gradually increases, the gate potential of the TFT T4 gradually increases as well. The luminance of the organic EL element L1 decreases within one frame period, leading to display screen flickering during low-frequency drive.

To solve this problem, the pixel circuit 36 according to the present embodiment is provided with the capacitor C2 connected to the intermediate node N3 at the first electrode and the control line Xi at the second electrode. The scanning line driver circuit according to the present embodiment changes the potential of the scanning line GNi from high to low level and also changes the potential of the control line Xi from the supplementary level (lower than high level) to high level, in the opposite direction to the change in the potential of the scanning line GNi, at a time corresponding to the change in the potential of the scanning line GNi (approximately at the same time as the change in the potential of the scanning line GNi).

When the potential of the scanning line GNi is changed from high to low level, the potential of the intermediate node N3 is pushed down to decrease. To counter this, the potential of the control line Xi is changed from the supplementary level to high level, in the opposite direction to the change in the potential of the scanning line GNi, whereby the potential of the intermediate node N3 is pushed down to increase. As a result, the decrease in the potential of the intermediate node N3 due to the pushing down is canceled out with the increase in the potential of the intermediate node N3 due to the pushing up, whereby the potential of the intermediate node N3 can be prevented from varying when the potential of the scanning line GNi is changed to low level. Thus, the organic EL display device according to the present embodiment renders it possible to prevent display screen flickering during low-frequency drive in the same manner as in the first and second embodiments.

As described above, the pixel circuit 36 in the organic EL display device according to the present embodiment includes the light-emitting element (organic EL element L1), the drive transistor (TFT T4) provided in series with the light-emitting element to control the amount of current flowing through the light-emitting element, the N-channel transistor (TFT T9*b*) serving as the first compensation transistor and connected to the control terminal (gate terminal) of the drive transistor at the first conductive terminal (source terminal), the intermediate node N3 at the second conductive terminal (drain terminal), and the second scanning line (scanning line GNi) at the control terminal (gate terminal), the P-channel transistor (TFT T9*a*) serving as the second compensation transistor and connected to the intermediate node N3 at the first conductive terminal (drain terminal), the drive transistor's conductive terminal close to the light-emitting element (drain terminal) at the second conductive terminal (source terminal), and the first scanning line (scanning line GPi) at the control terminal (gate terminal), and the capacitor C2 connected to the intermediate node N3 at the first electrode and the control line Xi at the second electrode. The driver circuit (scanning line driver circuit) changes the potential of the second scanning line from high to low level and also changes the potential of the control line Xi from the second level (supplementary level lower than high level) to the first level (high level), in the opposite direction to the change in the potential of the second scanning line, at a time corresponding to the change in the potential of the second scanning line (approximately at the same time as the change in the potential of the second scanning line).

In the present embodiment, as in the second embodiment, the organic EL display device renders it possible to cancel out the decrease in the potential of the intermediate node N3 that is caused by changing the potential of the second scanning line with the increase in the potential of the intermediate node N3 that is caused by changing the potential of the control line Xi. Thus, it is possible to prevent the potential of the intermediate node N3 from varying when the potential of the second scanning line is changed to off level and thereby prevent display screen flickering during low-frequency drive.

While the scanning line driver circuit has been described above as driving both the scanning lines and the control lines, the scanning lines and the control lines may be driven by different driver circuits. Moreover, for the potential of the control line Xi, the first level has been described as corresponding to either low or high level, but the first level may be a level other than low and high levels. The control line Xi may be a scanning line in the display portion. For example, in the case of the organic EL display devices according to the second and third embodiments, when the supplementary level is equal to low level, the control line Xi may be a scanning line GPi+1.

While the display devices that include pixel circuits incorporating light-emitting elements have been described, taking as examples some organic EL display devices that include pixel circuits incorporating organic EL elements (organic light-emitting diodes), inorganic EL display devices that include pixel circuits incorporating inorganic light-emitting diodes, QLED (quantum-dot light-emitting diode) display devices that include pixel circuits incorporating quantum-dot light-emitting diodes, and LED display devices that include pixel circuits incorporating mini or micro LEDs may be configured similarly to the display devices described above. Moreover, display devices with combined features of the above embodiments and variants may be configured by arbitrarily combining the features of the display devices described above without contradicting the nature of such combined features.

DESCRIPTION OF THE REFERENCE CHARACTERS

10, 20 organic EL display device
11, 21 display portion
12 display control circuit
13, 23 scanning line driver circuit
14 data line driver circuit
15 emission control line driver circuit
16, 26, 36 pixel circuit

The invention claimed is:

1. A display device comprising:

a display portion including a plurality of scanning lines, a plurality of control lines, and a plurality of pixel circuits; and a driver circuit configured to drive the scanning lines and the control lines, wherein, each of the pixel circuits includes:

a light-emitting element;

a drive transistor provided in series with the light-emitting element to control the amount of current flowing through the light-emitting element;

a first compensation transistor connected to a control terminal of the drive transistor at a first conductive terminal, an intermediate node at a second conductive terminal, and one of the scanning lines at a control terminal;

a second compensation transistor having the same conductivity type as the first compensation transistor and connected to the intermediate node at a first conductive terminal, the drive transistor's conductive terminal close to the light-emitting element at a second conductive terminal, and the one of the scanning lines at a control terminal; and a capacitor connected to the intermediate node at a first electrode and one of the control lines at a second electrode, and the driver circuit changes a potential of the one of the scanning lines from on to off level and also changes a potential of the one of the control lines from a second level to a first level, in an opposite direction to the change in the potential of the one of the scanning lines, at a time corresponding to the change in the potential of the scanning line, wherein the driver circuit changes the potential of the one of the scanning lines from off to on level, then changes the potential of the one of the control lines from the first level to the second level, then changes the potential of the one of the scanning lines from on to off level, and then changes the potential of the one of the control lines from the second level to the first level.

2. The display device according to claim 1, wherein the potential of the one of the control lines is at the second level for a period as long as a period during which the potential of the one of the scanning lines is at on level.

3. The display device according to claim 1, wherein the potential of the one of the control lines is at the second level for a period longer than a period during which the potential of the one of the scanning lines is at on level.

4. The display device according to claim 1, wherein, the first and second compensation transistors are P-channel transistors, the first level corresponds to low level, and the second level is a level higher than low level.

5. A display device comprising:

a display portion including a plurality of first scanning lines, a plurality of second scanning lines, a plurality of control lines, and a plurality of pixel circuits; and a driver circuit configured to drive the first scanning lines, the second scanning lines, and the control lines, wherein, each of the pixel circuits includes:

a light-emitting element;

a drive transistor provided in series with the light-emitting element to control the amount of current flowing through the light-emitting element;

a first compensation transistor connected to a control terminal of the drive transistor at a first conductive terminal and an intermediate node at a second conductive terminal;

a second compensation transistor connected to the intermediate node at a first conductive terminal and the drive transistor's conductive terminal close to the light-emitting element at a second conductive terminal; and a capacitor connected to the intermediate node at a first electrode and one of the control lines at a second electrode, and one of either the first or second compensation transistor is a P-channel transistor connected to one of the first scanning lines at a control terminal, the other of the first or second compensation transistor is an N-channel transistor connected to one of the second scanning lines at a control terminal, and the driver circuit changes a potential of the one of the second scanning lines from high to low level and also changes a potential of the one of the control lines from a second level to a first level, in an opposite direction to the change in the potential of the one of the second scanning lines, at a time corresponding to the change in the potential of the one of the second scanning lines.

6. The display device according to claim 5, wherein the driver circuit changes the potential of the one of the second scanning lines from low to high level, then changes the potential of the one of the control lines from the first level to the second level, then changes the potential of the one of the second scanning lines from high to low level, and then changes the potential of the one of the control lines from the second level to the first level.

7. The display device according to claim 5, wherein the driver circuit changes the potential of the one of the second scanning lines from low to high level, then changes the potential of the one of the first scanning lines from high to low level, then changes the potential of the one of the first scanning lines from low to high level, and then changes the potential of the one of the second scanning lines from high to low level.

8. The display device according to claim 5, wherein the driver circuit changes the potential of the one of the second scanning lines from low to high level, then changes the potential of the one of the first scanning lines from high to low level, then changes the potential of the one of the control lines from the first level to the second level, then changes the potential of the one of the first scanning lines from low to high level, then changes the potential of the one of the second scanning lines from high to low level, and then changes the potential of the one of the control lines from the second level to the first level.

9. The display device according to claim 5, wherein the potential of the one of the control lines is at the second level for period as long as a period during which the potential of the one of the first scanning lines is at on level.

10. The display device according to claim 5, wherein, the first compensation transistor is a P-channel transistor, the second compensation transistor is an N-channel transistor, the first level corresponds to high level, and the second level is a level lower than high level.

11. The display device according to claim 5, wherein, the first compensation transistor is an N-channel transistor, the second compensation transistor is a P-channel transistor, the first level corresponds to high level, and the second level is a level lower than high level.

12. The display device according to claim 5, wherein the N-channel transistor is formed with an oxide semiconductor.

13. The display device according to claim 5, wherein the light-emitting element is an organic electro-luminescent element.

14. A method for driving a display device having a display portion that includes a plurality of first scanning lines, a plurality of second scanning lines, a plurality of control lines, and a plurality of pixel circuits, wherein each of the pixel circuits includes a light-emitting element, a drive transistor provided in series with the light-emitting element to control the amount of current flowing through the light-emitting element, a first compensation transistor connected to a control terminal of the drive transistor at a first conductive terminal and an intermediate node at a second conductive terminal, a second compensation transistor connected to the intermediate node at a first conductive terminal, the drive transistor's conductive terminal close to the light-emitting element at a second conductive terminal, and a capacitor connected to the intermediate node at a first electrode and one of the control lines at a second electrode, one of either the first or second compensation transistor being a P-channel transistor connected to one of the first scanning lines at a control terminal, the other of the first or second compensation transistor being an N-channel transistor connected to one of the second scanning lines at a control terminal, and the method comprises:

driving the first and second scanning lines; and driving the control lines, wherein, the one of the second scanning lines has a potential changed from high to low level, and the one of the control lines has a potential changed from a second level to a first level, in an opposite direction to the change in the potential of the one of the second scanning lines, at a time corresponding to the change in the potential of the one of the second scanning lines.

15. The display device according to claim 1, wherein the light-emitting element is an organic electro-luminescent element.

* * * * *